May 31, 1966 C. K. STILLWAGON 3,253,815
BUTTERFLY VALVE SEAT CONSTRUCTION
Filed May 2, 1963
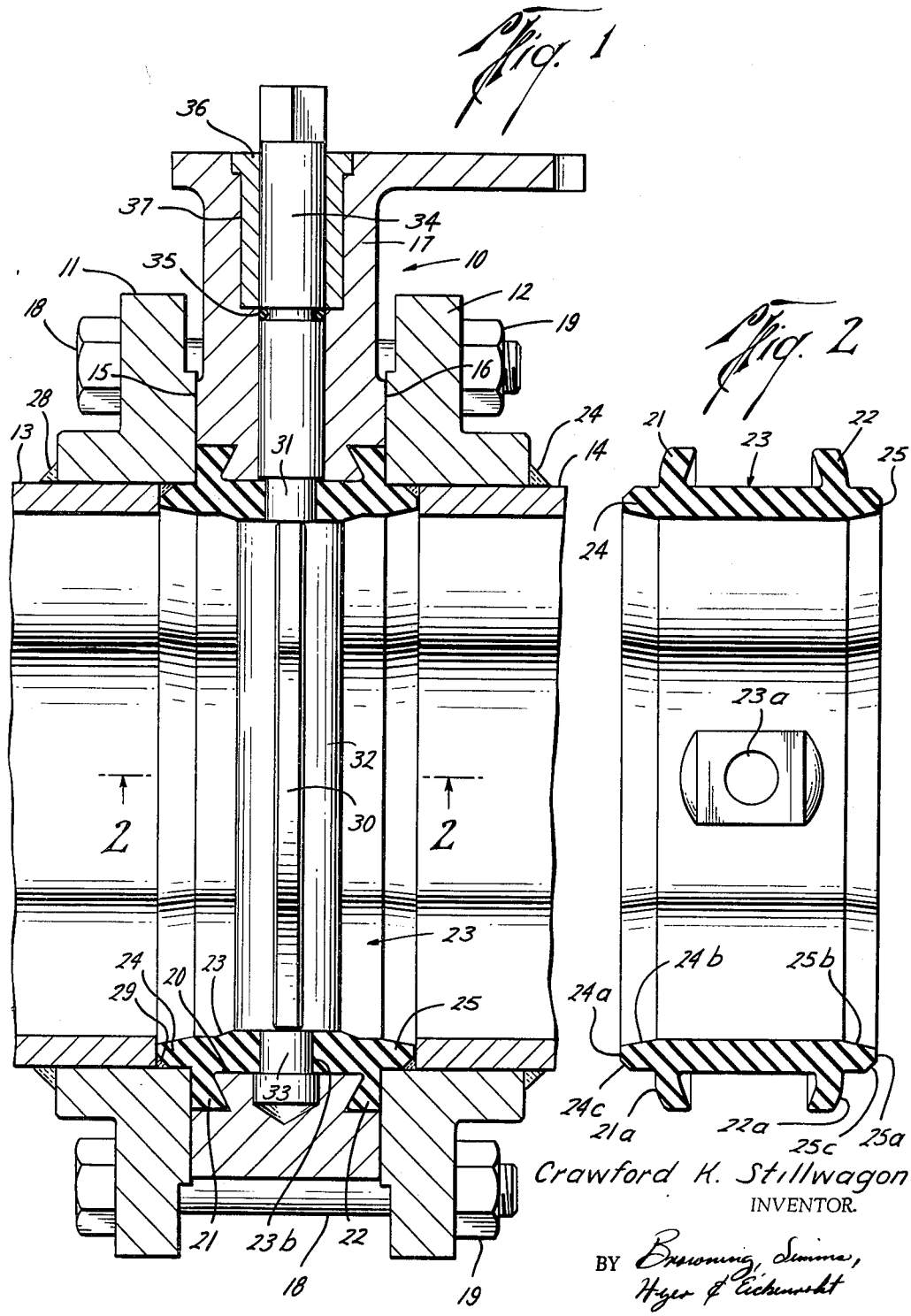
Crawford K. Stillwagon
INVENTOR.
BY Browning, Simms,
Hyer & Eichenroht
ATTORNEYS United States Patent Office 3,253,815
Patented May 31, 1966

3,253,815
BUTTERFLY VALVE SEAT CONSTRUCTION
Crawford K. Stillwagon, Houston, Tex., assignor to Keystone Valve Corp., Houston, Tex., a corporation of Texas
Filed May 2, 1963, Ser. No. 277,579
3 Claims. (Cl. 251—148)

This invention relates to improved disc valves and disc valve seats particularly adapted for installation between "slip-on" flanges in a pipeline where the flanges extend beyond the ends of the pipes to which they are connected.

When "slip-on" flanges are located with their end faces flush with the ends of the pipes to which they are connected, they present no problem since they are structurally the equivalent of the conventional one-piece flange between which the valve is designed to be installed. However, since it is the purpose of such flanges to make it possible to adjust slightly the effective positions of the ends of pipes, in the usual installation, "slip-on" flanges extend past or beyond the ends of the pipes. For example, when a disc valve of the type shown in U.S. Patent No. 2,740,423 is installed in an existing line, both ends of which are fixed, the opening cut in the line may be too wide for the valve. Slip-on flanges are then slipped on the pipe ends with the valve between them and clamped together against opposite sides of the valve body, after which they are both welded to the pipe ends. Each flange will then extend beyond the end of the pipe on which it is mounted in order to engage the valve body. Whenever this occurs, an annular space will exist between the end of the pipe and the inner end seal faces of the valve seat, creating an enlargement in the flowway through the pipeline at each end of the valve. These enlargements are undesirable for many reasons. They are traps for debris which is a particularly undesirable feature when the valve is used in the food and beverage industry since they provide a place for material to collect, spoil and contaminate later batches of material flowing through the line. Further, when the material being carried through the line is corrosive, these annular spaces between the valve seat and the ends of the pipe expose the inner bore of the flanges to the corrosive action of the fluids. In addition, if an internal weld is not used between the end of the pipe and the flange, the outside diameter of the pipe within the flange between the outside weld and the end of the pipe is also exposed to the corrosive action of the fluids.

It is an object of this invention to provide a disc valve for use with slip-on flanges which extend beyond the ends of the pipes to which they are attached which will provide a continuous flowway through the valve between the two joints of pipe which is free of enlargements where solid material or liquid can collect.

Another object of this invention is to provide a disc valve and seat which will protect the inner surfaces of the slip-on flanges from any corrosive fluids carried by the pipeline in which the valve is installed even though the slip-on flanges extend beyond the ends of the pipes to which they are attached.

It is another object of this invention to provide a disc valve having a seat which provides a pressure energized seal between the seat and the inner bore of the slip-on flanges between which the valve is installed.

It is a further object of this invention to provide a valve seat for a disc valve which can obtain a compression type seal between the face of the slip-on flange and the valve body and also between the ends of the pipe to which the flanges are attached and the valve body even though the flange faces are not flush with the ends of the pipe sections to which they are attached.

These and other objects, features and advantages will become apparent to one skilled in the art when considered in connection with the specification, drawings and appended claims.

In the drawings:

FIG. 1 is a cross-sectional view of a disc valve embodying this invention installed between slip-on flanges which extend beyond the ends of the pipe to which they are attached; and FIG. 2 is a cross-sectional view through the valve seat shown in FIG. 1, separate from the rest of the valve, taken along line 2—2 of FIG. 1.

The disc valve embodying this invention, generally indicated by the number 10, is shown in FIG. 1 installed between two slip-on flanges 11 and 12 which in turn are welded to two pipe sections 13 and 14. The slip-on flanges each have flat sealing faces 15 and 16 which engage the body 17 of the valve and hold it in position in the line. These flange faces are held in engagement with the valve body by means of bolts 18 and nuts 19, a plurality of which encircle the valve body and extend through holes provided therefor in both flanges.

The body of the valve is provided with an inwardly extending, annular dovetailed ring or flange 20 which forms annular undercut recesses on each end of the body and which may be integral with the body. Located within the body is valve seat 23 comprising a resilient body made from an elastomer, preferably natural or synthetic rubber, so it can be molded into the desired shape. The seat has a longitudinal opening through it to provide a flowway for the valve and integrally attached, radially outwardly extending annular flanges 21 and 22. When the seat is installed in the valve, these annular flanges are located in the annular recesses on each side of ring 20. They are formed to extend axially beyond body 17, as shown at 21a and 22a, when the valve is not assembled between the flanges so that, when the valve is assembled, they will be compressed between faces 15 and 16 of the flanges and the dovetailed annular ring 20 to produce compression type seals therebetween to prevent fluids from leaking from the pipeline between the flange and the body of the valve. This clamping of flanges 21 and 22 also tightly anchors the seat in place along its opposite edges and slightly stretches its midsection which actually provides the seat for the valve.

As shown in FIG. 1, slip-on flanges 11 and 12 extend beyond the ends of the pipes to which they are attached, creating annular spaces between the ends of the pipe and the planes of sealing faces 15 and 16 of the flanges which, if not eliminated, will provide grooves or enlargements in the flowway through the pipeline and convenient places for debris and solid material to collect which can be very undesirable, as explained above. In accordance with this invention, to eliminate these enlargements, valve seat 23 is provided with integral, axially extending annular rings or flanges 24 and 25 which bridge the space between the valve seat and the ends of the pipe.

The annular rings 24 and 25 have an outside diameter approximately equal to the inside diameter of the flanges, flat end sealing faces 24a and 25a for engaging the ends of the pipe and, preferably, slightly tapered inner bores 24b and 25b tapering outwardly toward the ends of the rings. Since the distance that the flange will extend beyond the pipe is usually not known in advance, and it is commercially not feasible to provide a valve seat for each situation, the axial length of the rings 24 and 25 is a compromise. Thus, end faces 24a and 25a of the rings will engage the ends of the pipe with varying amounts of force. For this reason, the rings 24 and 25 are provided with the tapered bores 24b and 25b which allow the resilient material of the rings to bulge inwardly under the compressive force of the pipe ends, yet not produce a restriction in the flowway through the line.

When annular rings 24 and 25 are in engagement with the ends of the pipe, they provide two additional seals for preventing leakage of fluid from the pipeline, the compressive seal between end faces 24a and 25a and the ends of the pipe, and the pressure energized seal between the rings and the bores of the flanges. Of course, the first seal, the compressive seal between the ends of the pipe and the rings, will be in part a fluid actuated seal since the pressure of the fluid in the line acting on the inner bore of the rings will tend to elongate the rings, thereby increasing the sealing force between ends of the ring and the pipe. Thus, the distance the flanges extend beyond the ends of the pipe can vary considerably without affecting the ability of the annular rings to perform their function.

When the distance between the ends of the pipe and the faces of the flanges is such that the axial compressive force in the rings is very slight, the tapered inner surfaces of the rings will produce a small enlargement in the flowway adjacent the pipe ends. However, this enlargement is not such as to collect any debris, etc. since there will be sufficient turbulence created adjacent the enlargement by the end of the pipe to keep an enlargement this small washed out.

When it is apparent that the slip-on flanges to be used cannot be located flush with the ends of the pipe, it is common practice to attach the flange to the pipe with both an external weld 28 and an internal weld 29. To accommodate this internal weld, the edges of annular rings 24 and 25 are provided with bevels 24c and 25c.

To control the flow of fluids through the line, the valve is provided with a valve disc 30 which is located within seat 23 and mounted on valve stem 31 whichi s rotatably mounted in body 17. The outer edge of the valve disc has a greater diameter than the inside diameter of the valve seat, causing the valve seat to exert sufficient force against the valve element to maintain a seal between the two when the valve is closed. The valve disc also is provided with a central tubular portion 32 which is sufficiently long to maintain a compressive seal with the valve seat at all times and prevent fluids from escaping through opening 23a provided for valve stem 31 in valve seat 23. The stem includes a lower end 33 which is journaled in the lower portion of the valve body and an upper stem portion 34 journaled in the upper portion of the tubular body and extending exteriorly of the body for manipulation by a suitable tool in rotating the disc between its open and closed positions.

The stem end portions are removably received through holes 23a and 23b in the valve seat to permit separation of stem and disc for replacing the seat. These holes are smaller in diameter than the stem end portions to provide a seal between the stem and seat. This seal, along with the seal between the seat and tubular portion 32 of the valve disc, combine to prevent fluid from escaping from the valve between the seat and the valve stem.

To prevent dust, etc. from entering the valve, an O-ring 35 surrounds stem portion 34 to form a seal with it and the upper portion of the body. A bushing 36 is received within the counterbore 37 of the body to surround stem end portion 34 above seal ring 35 and provide a bearing for the upper portion of the stem.

From the above description of the preferred embodiment of the invention, it is apparent that by providing the valve seat with axially extending annular rings, a troublesome problem created by the use of slip-on flanges has been eliminated.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A disc valve adapted to be installed between two flange fittings comprising a tubular body; flange fittings having end faces engaging each end of the tubular body; a pipe section attached to each flange fitting with each flange fitting being located with its end face lying in a plane spaced beyond the end of the pipe section to which it is attached; an annular seat member of resilient elastomer material located in the tubular body, said heat having end sealing surfaces in engagement with the end faces of the flanges, a longitudinal opening to provide a flowway through the valve, and axially extending annular rings of resilient elastomer material integrally attached to the seat member to provide an extension to the flowway and to at least partially fill the annular space between the ends of the pipe and the plane of the end faces of the flange fittings; and a valve disc rotatably mounted in the body and located within the flowway through the seat to control the flow of fluid through the flowway.

2. A disc valve adapted to be installed between two flange fittings of the slip-on type, each fitting including an annular body with an outwardly extending flange attached to one end and provided with a flat sealing face lying in a plane perpendicular to the longitudinal axis of the annular body of the fitting; a pipe section extending into the annular body of each fitting to a point short of the end to which the flange is attached to provide an annular space within the annular body of the fitting between the end of the pipe and the plane of the flat sealing faces on the flanged end of the fitting; said fitting being attached to the pipe; said valve comprising a tubular body located between the flanges of the fittings, a resilient seat made of an elastomer, said seat having end faces in sealing engagement with the flat sealing faces on the flanges, a longitudinal opening providing a flowway through the valve, and axially extending rings made of an elastomer integrally attached to each end of the seat below the end faces to extend into the annular space within the fittings and engage the ends of the pipe to provide a continuous flowway having approximately the same diameter through the valve between the ends of the pipe sections; and a valve disc located within the seat and rotatably mounted in the valve body to control the flow of fluids through the valve.

3. A disc valve adapted to be installed between two flange fittings attached to two sections of pipe, the flange fittings having confronting parallel end sealing faces and an opening for receiving the pipe, the fittings being attached to the pipe with their end faces lying in a plane spaced axially beyond the ends of the pipe, said valve comprising a tubular body, an annular ring extending inwardly of the body and located approximately midway of its ends; a resilient seat located in the body, said seat being made of molded elastomer material and having an opening to provide a flowway through the valve, said seat being further provided with axially extending annular rings having an opening therethrough approximately equal to the opening through the seat, said rings being integrally attached to the seat and extending axially into the opening in the fittings to engage the end of the pipe and provide a continuous flowway through the valve of approximately the same diameter from one section of pipe to the other, said seat having outwardly extending, integrally attached annular flanges, each flange being compressed between the end sealing face of one of the fittings and the annular ring; and a valve disc rotatably mounted in the body for controlling the flow of fluids through the opening in the seat.

References Cited by the Examiner
UNITED STATES PATENTS

| | | | |
|---|---|---|---|
| 1,947,257 | 2/1934 | Fritz | 137—375 |
| 2,740,423 | 4/1956 | Stillwagon | 137—454.2 |
| 3,084,715 | 4/1963 | Scharres | 251—306 X |
| 3,118,465 | 1/1964 | Scaramucci | 251—308 X |

ISADOR WEIL, *Primary Examiner.*

M. CARY NELSON, *Examiner.*

H. W. WEAKLEY, *Assistant Examiner.*